Oct. 27, 1964  W. T. RENTSCHLER  3,153,994
PHOTOGRAPHIC CAMERA WITH AUTOMATIC AND MANUAL EXPOSURE SETTING
Filed April 6, 1962  2 Sheets-Sheet 1
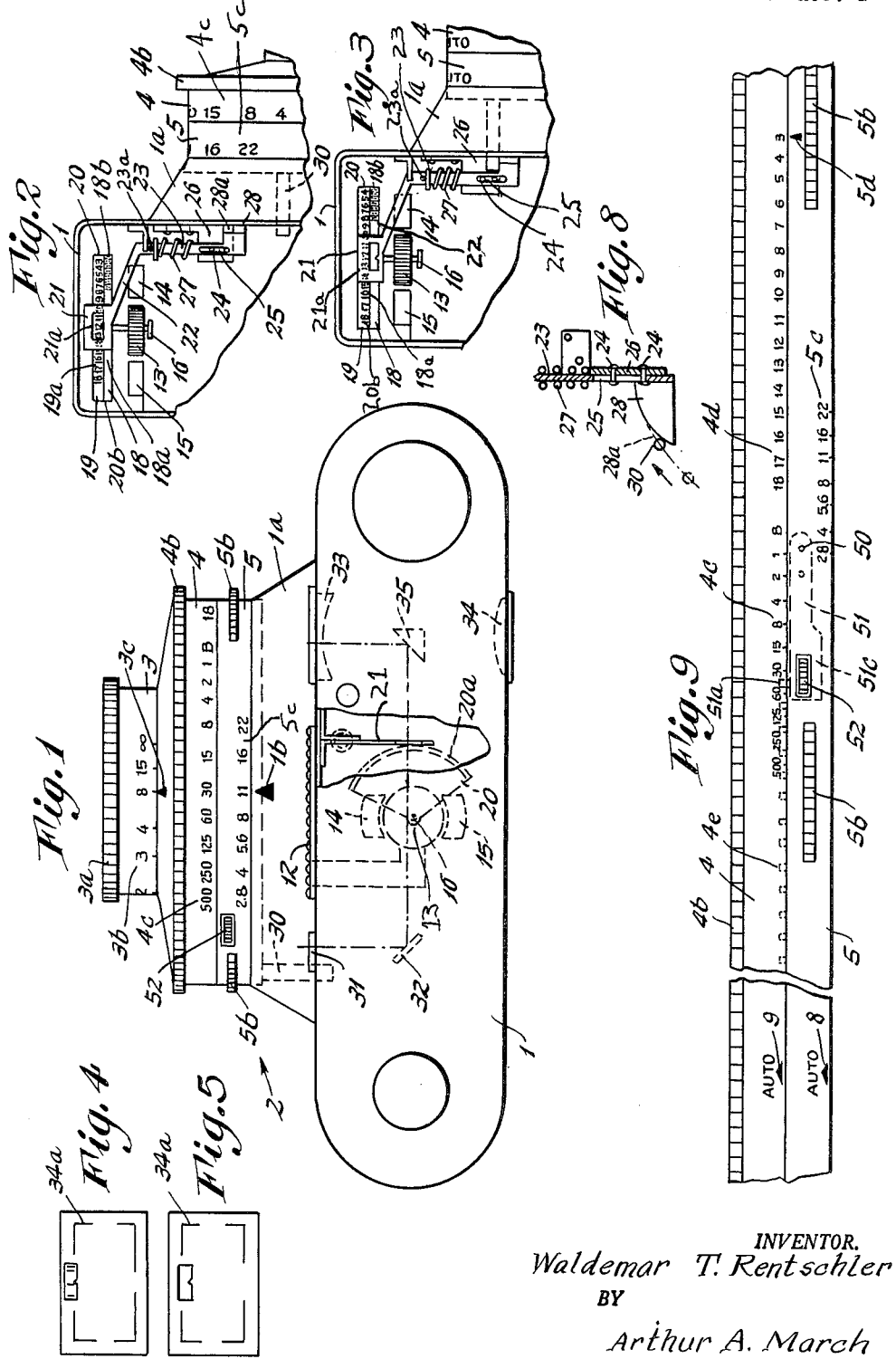
INVENTOR.
Waldemar T. Rentschler
BY
Arthur A. March
ATTORNEY Oct. 27, 1964     W. T. RENTSCHLER     3,153,994
PHOTOGRAPHIC CAMERA WITH AUTOMATIC AND MANUAL EXPOSURE SETTING
Filed April 6, 1962     2 Sheets-Sheet 2
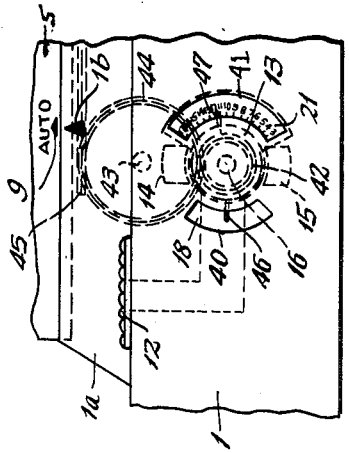
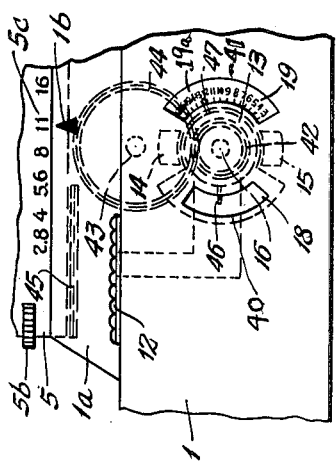
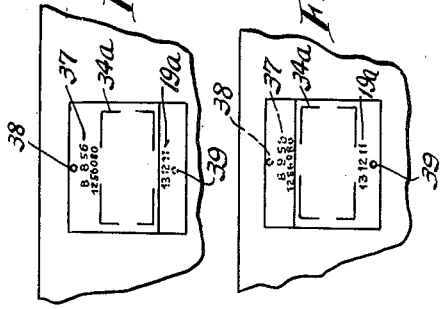
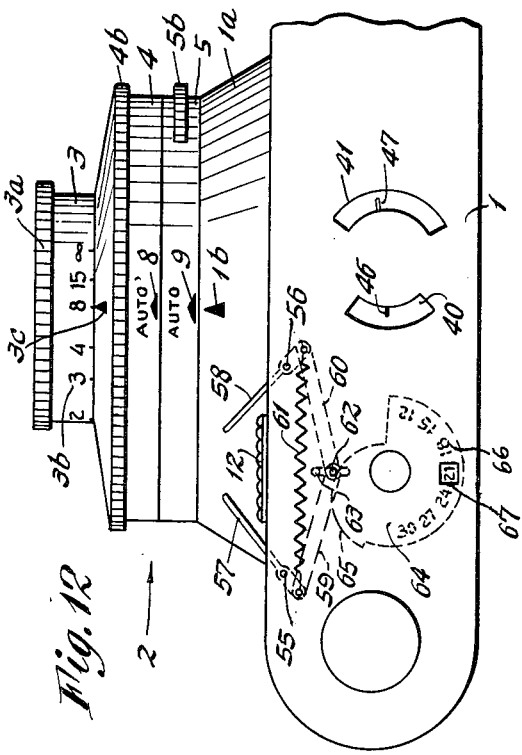
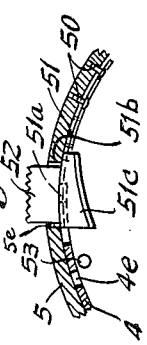
INVENTOR.
Waldemar T. Rentschler
BY
Arthur A. March
ATTORNEYS

United States Patent Office 3,153,994
Patented Oct. 27, 1964

3,153,994
PHOTOGRAPHIC CAMERA WITH AUTOMATIC
AND MANUAL EXPOSURE SETTING
Waldemar T. Rentschler, Calmbach (Enz), Germany,
assignor to Alfred Gauthier, G.m.b.H., Calmbach (Enz),
Germany, a corporation of Germany
Filed Apr. 6, 1962, Ser. No. 185,548
Claims priority, application Germany Apr. 21, 1961
9 Claims. (Cl. 95—10)

The invention relates in general to a photographic camera, and more specifically to a camera having a built-in exposure meter and a manually operable setting member by which the camera can be selectively switched to either automatic or manual exposure setting.

It is the object of the invention to disclose a camera of the above-described type which permits complete utilization of the built-in exposure meter which is of relatively simple construction, and which ensures a maximum of operability and dependability as well as operational simplicity for either automatic or manual operation.

The above object and other features and advantages of this invention are attained by an indicating member having two graduated scale fields arranged on the exposure meter and a covering flag, which is influenced by a reversing member associated with the indicating member. The covering flag is rendered adjustable in a manner so as to render one scale field visible for automatic exposure setting of the camera and to render the other scale field visible for manual exposure setting of the camera.

The above setup makes it possible to obtain an optimum utilization of the built-in exposure meter, since the latter can now be selectively utilized for indicating the prevailing lighting conditions during either automatic or manual operation of the camera. In addition, the exposure meter is relatively simple and produces the result that, depending on the desired setting, the scale optimally suited for the latter is rendered clearly visible. For example, in case of automatic exposure setting of the camera, a yes-or-no statement with respect to the admissibility of an exposure can be effected by a green or red color field indication responding to prevailing light conditions, while in the case of manual exposure setting of the camera, a suitable numbered scale will clearly and accurately show the light conditions. In this connection, it is of special importance that, for the purpose of avoiding errors, only that scale field or indicating field associated with either automatic or manual setting be made visible at any given time. This ensures a maximum of operational clarity and dependability.

In order to obtain good visibility, the scale field associated with the manual exposure setting may be provided with a known exposure value scale, and, in addition, an identical exposure value scale as well as a setting mark therefor may be arranged on the setting members for exposure time and diaphragm. This creates favorable conditions for permitting the operator, even when manually operating the camera, to carry out a setting of same with the aid of the exposure meter without any substantial mental work.

A further advantageous and expedient development of the invention may consist in that, upon switching the camera from automatic to manual exposure setting, a releasable coupling provided between the two setting members for exposure time and diaphragm becomes operative. This device permits the photographer to conveniently select a specific time/diaphragm combination associated with the respective exposure value by actuating a single setting member.

An operationally particularly suitable embodiment of the camera according to the invention is further obtained in that one of the setting members for exposure time and diaphragm serves as a switching member for selectively setting the camera at the desired kind of exposure setting.

Other features and advantages of the invention will become more apparent from the following description and the drawing in which there are illustrated two embodiments of a photographic camera, each of which is selectively switchable to automatic and manual exposure setting and which is provided with an intra-lens shutter equipped with a device for controlling the exposure time and diaphragm according to a predetermined program.

In the drawings:

FIG. 1 shows the top view of the photographic camera having parts thereof broken away and illustrating the lighting conditions registered by an exposure meter and indicated by a scale being mirrored into the view finder lens;

FIG. 2 is a partial view of the photographic camera showing a cross-sectional view of the housing during manual exposure setting of the camera;

FIG. 3 is a view similar to that of FIG. 2, but showing the camera at automatic exposure setting;

FIG. 4 is a view finder picture, as it appears at manual exposure setting of the camera according to FIG. 2;

FIG. 5 is a view finder picture at automatic exposure setting of the camera according to FIG. 3;

FIGS. 6 and 7 show another possibility of the exposure indication in the view finder, whereby a time/diaphragm combination or an exposure value becomes visible in the view finder picture depending on the exposure setting of the camera;

FIG. 8 shows a fragmental section through the supporting and displacing device of the covering flag cooperating with the indicating member of the exposure meter as shown in FIG. 2;

FIG. 9 shows a development of the setting rings for exposure time and diaphragm;

FIGS. 10 and 11 show a partial top view of a photographic camera at manual or automatic exposure setting in connection with another embodiment of the indicating member associated with the exposure meter, whereby the light conditions registered by the exposure meter are readable in a window of the camera case depending on the kind of the exposure setting of the camera;

FIG. 12 also shows a diagrammatic top view of a photographic camera equipped with the indicating member and additionally equipped with a shading (-off) device acting on the photo-electric cell for taking into account the sensibility of the film used; and FIG. 13 shows the coupling between the setting members for exposure time and diaphragm, which becomes operative in case of manual exposure setting.

Referring now the drawing, there is shown a photographic camera comprising a housing 1 and a front plate 1a on its front side. The front plate 1a carries a shutter 2, which is provided with the lens as well as with an exposure time and diaphragm setting device on which are rotatably positioned a distance setting member 3 coaxially with the axis of the lens, as well as setting members 4 and 5 for exposure time and diaphragm. The range setting member 3 is provided with a knurled knob 3a and is settable with its meter scale 3b with respect to a fixed mark 3c, while the setting members 4 and 5 are also provided with either a knurled knob 4b or with two diametrically opposite finger manipulating means 5b. For the purpose of manually setting the camera, setting members 4 and 5 are each provided with an exposure time or diaphragm scale 4c and 5c arranged on the rings, and associated with scale 5c is a mark 1b mounted on the fixed front plate 1a. In addition to the exposure time scale 4c, the setting member 4 carries, as is especially apparent from FIG. 9, an exposure value scale 4d, and it is associated with a setting mark 5d mounted on the diaphragm setting member 5. If desired, the exposure value scale 4d may be carried by the diaphragm setting member 5 instead of by the exposure time setting member 4, and the latter would accordingly carry the mark 5d. For the purpose of selectively effecting exposures, either with automatic or manual exposure setting of the camera, the two manually operable setting members 4 and 5 for exposure time and diaphragm are provided with a mark 8 or 9 identified by the word "Auto" (FIG. 9). If the camera is to operate with automatic exposure setting, marks 8 and 9 must be made to coincide with the fixed mark 1b of the front plate 1a, while, for the purpose of the manual exposure setting, the scale values 4c and 5c of the setting members 4 and 5 for exposure time and diaphragm are to set at the fixed mark 1b.

As is further apparent from the drawings, reference numeral 12 is the honeycomb window of an exposure meter which includes a moving coil 13 and two magnets 14 and 15 as well as a photoelectric cell (not shown). The exposure meter is built into the camera case 1 so that the shaft 16 carrying the moving coil 13 extends perpendicularly to the upper side wall of the camera case. Upon automatic exposure setting of the camera, the movable member 13 of the exposure meter 12 to 16 are connected, in a manner known, to the members arranged in the shutter and used for setting exposure time and diaphragm, in such a manner that the camera is set automatically in response to the light intensity when the release member is actuated. However, this connection of the exposure meter with the setting members for exposure time and diaphragm is not the subject matter of the invention, nor are the members used for the setting of exposure time and diaphragm which become operative in the range of the manual exposure setting of the camera.

For the purpose of obtaining the best possible utilization of the exposure meter with the greatest possible operational clarity, dependability and simplification in the handling of the camera, which is selectively switchable to automatic or manual exposure setting, the invention provides an indicating member 20 having two scale-fields 18 and 19 arranged in the exposure meter and a covering flag 21, which may be either in the form of a slide or dial. As shown in FIGS. 2, 3, flag 21 is a slide which is being influenced in its position either by a special setting member or by the setting members 4 and 5 for exposure time and diaphragm. According to this invention flag 21 is associated with indicating member 20, and it is adjustable in such a manner that one scale-field 18 becomes visible through the slide 21 in case of automatic exposure setting and the other scale field 19 becomes visible through the slide 21 in case of manual exposure setting.

According to the embodiment shown in FIGS. 1 to 3, the indicating member 20, which is fixedly connected to the moving-coil shaft 16 may be formed, for example, of a segment-like platelet, preferably made of transparent material, and whose arcuate peripheral zone comprises a rectangular bevel 20a. When a metallic platelet is used, the bevel 20a may be replaced with a special peripheral strip of transparent material, which is connected to said platelet at a right angle thereto.

This arcuate sheet-like structure consisting of a marginal strip or of a bevel is subdivided into two scale-fields 18 and 19 by a longitudinally running marking line 20b. In the embodiment according to FIGS. 1 to 3, the top scale field 19 is provided, according to the invention and in accordance with the exposure value scale 4d of the setting member 4 for the exposure time, with a scale 19a showing the same exposure values, while the bottom scale field 18 is subdivided into two partial sections 18a and 18b by a different coloring. Referring to FIGS. 2 and 3, the left section 18a of the scale field 18, for example, may be colored green, while the right section 18b identified by dotted lines in the drawing may be colored red. Cooperating with the indicating device 20 is a flag 21 as stated above.

The flag 21 comprises a slide-like member in the embodiment of FIGS. 1 to 3, and is settable opposite with respect to the scale fields 18 and 19. Depending on the kind of exposure setting, either the lower or the upper scale fields 18 or 19 will be located in the range of a window 21a provided in the covering flag 21. As especially apparent from FIGS. 2 and 3, an arm 22 serves to support and displace the covering flag 21, arm 22 being firmly connected to a sliding rod 23 movable parallel to the front side wall of the camera case 1. The sliding rod 23, in turn, may be displaceably positioned, by means of sliding guides 24, 25, on a holding frame 26 fixed on the camera case 1. A spring 27 supported at one end by the holding frame 26 and on the other end by a pin 23a of the sliding rod 23 is provided for the purpose of urging the rod 23 in a position in which the upper scale field 19 lies in the range of the window 21a of the covering flag 21. For the purpose of displacing or setting the covering flag 21, a ramp 28 is arranged on the sliding rod 23 suitably at its lower end, the ramp 28 being in the path of motion of a driving pin 30 secured to the setting members 4 and 5 for exposure time and diaphragm. This arrangement is made in such a manner that the driving pin 30, as shown in FIG. 8, rides up the ramp 28 and moves the sliding rod 23 or the covering flag 21 against the action of the spring 27 from the upper into the lower position, as soon as the operating means for bringing about the selected exposure operation are caused to cover, by means of their marks 8 and 9 identified by the word "Auto," the fixed mark 1b of the front plate 1a. The indication of the light conditions is thus effected by the lower scale field 18 in case of automatic exposure setting of the camera. The upper scale field 19 provided with the exposure value scale 19a serves to indicate light conditions in case of manual exposure setting of the camera.

In order to read the indicating member 20 built into the camera case 1 together with the exposure meter, the embodiment according to FIGS. 1 to 3 provides for the arrangement of a light-incident window 31 on the front side of the camera case and for a mirror 32 which is fixed inside the case and is associated with said window 31. The arrangement of the mirror 32 is such that the incident light rays are first turned round, in order to impinge on the indicating member 20 in the range of the covering flag 21. Supplementing this device, the invention provides for a reversing prism 35 which is located in the ray path of the view finder lens 33, 34 and which intercepts the light rays passing through the window 21a of the covering flag 21 and mirrors them directly into the view finder lens. There then appears, depending on the setting of the camera, as shown in FIGS. 4 and 5, a view finder picture, namely, either above the luminous frame view finder 34a, a specific exposure value of the scale 19a or within the luminous frame view finder 34a a specific coloring of the scale field 18. The green color indicates that an exposure is possible at prevailing light conditions, while the red color must be interpreted as a signal that no photograph must be taken.

In another manner, the scale field 18 of the indicating member 20 associated with the automatic exposure setting may also be provided with specific time/diaphragm value pairs 37 which, as is apparent from FIG. 7, are visible in the view finder picture of the view finder lens 33, 34 upon appropriate exposure setting of the camera or of the covering flag 21. The time/diaphragm pair which is located below a marking 38 is applicable to the exposure. The time/diaphragm pairs, in turn, are aligned with the above-mentioned program control for time and diaphragm, which is conventional in cameras with automatic exposure regulation. In order to avoid errors, the numerical values of the exposure value scale 19a must not appear together with the time/diaphragm value pairs in the view finder picture, but must do so only when the camera and, hence, the covering flag 21 has been switched to manual exposure setting, as indicated in FIG. 6, in which case the valid scale value can be read above the marking 39.

In the embodiment according to FIGS. 10 and 11, the two scale fields 18 and 19 associated with the exposure meter are arranged directly underneath the upper side wall of the camera case 1 and are visible through appropriate curved viewing windows 40 and 41 provided on the wall of the case. In this instance, too, the scale field 19 provided with an exposure value scale 19a serves to indicate the light conditions at manual exposure setting of the camera, while the scale field 18 indicates the light conditions at automatic exposure setting of the camera. In a manner similar to that of the embodiment according to FIGS. 1 to 3, a flag 21 is provided for the purpose of alternately covering the scale fields 18 and 19. In view of the concentric arrangement of the scale fields 18 and 19 with respect to the exposure meter 12 to 16, the flag 21 is developed as a dial (rotating disc) and is rotatably positioned on the moving-coil shaft 16 of the exposure meter. The covering flag 21 further comprises a pinion 42 which is firmly connected to said flag and which meshes with an intermediate gear 44 positioned on a fixed axle 43 in the camera case 1. The intermediate gear 44, in turn, meshes with a toothed segment 45 provided on the setting members 4 and 5 for exposure time or diaphragm. The toothed segment 45 is so arranged with respect to the setting range of the setting member or setting members 4 and 5 on the latter that the covering flag 21 exposes to view the scale 18 at "Auto" setting (FIG. 11), and the scale 19 with its exposure value scale 19a at manual exposure setting (FIG. 10). In accordance with the embodiment shown in FIGS. 10 and 11, the light conditions are indicated by two pointers 46 and 47 coupled with the exposure meter. The arrangement of pointers 46, 47 is such that, for example, at automatic exposure setting of the camera, it is still possible to carry out an exposure when the pointer 46 of the exposure meter plays over the scale field 18, i.e., if it is still visible in the viewing window 40 of the camera case 1. In case of manual exposure setting, where the scale field 18 is covered, the exposure value scale 19a of the scale field 19 gives information about the light conditions which are indicated by the position of the pointer 47.

In order to facilitate to the photographer the selection of a specific time/diaphragm pair associated with the respective exposure value, a releasable coupling 51 is built into the camera, which coupling is provided between the two setting members 4 and 5 for exposure time and diaphragm and becomes operative upon the automatic exposure setting being switched to manual exposure setting. As shown in FIG. 9, coupling 51 may consist of an elastic blade fixed on the diaphragm setting member 5 by means of screws or rivets 50, the free end of the blade comprising an arresting tooth 51a extending parallel to the axis of the shutter. The tooth engages a gap between the arresting teeth 4e on the face of the cylinder jacket of the exposure time setting member 4. The number of the arresting teeth 4e is such that, upon manual exposure setting of the camera, it is possible to set all time/diaphragm pairs corresponding to the separate exposure values of the exposure value scale 4d, as well as intermediate values thereof.

The elastic blade of the coupling 51 may be actuated by means of a handle 52 radially movable in a recess 5e of the diaphragm setting ring 5. Handle 52 which is suitably connected to the elastic blade of the coupling 51, is depressed to release the coupling, whereby the arresting tooth 51a of the coupling blade moves out of the range of the equidistant arresting teeth 4e of the exposure time setting member 4.

In order to ensure that the releasable coupling 51 becomes operative only when the camera is switched from automatic to manual exposure setting, the tongue of the coupling 51 may be provided, for example, with an inclined plane or as bent tab 51c which, as shown in FIGS. 9 and 13, cooperates with a pin 53 fixed on the front plate 1a, when the setting members 4 and 5 for exposure time and diaphragm are moved into automatic position. Appropriately, the arrangement will be such that the pin 51c becomes operative, as soon as the diaphragm setting ring 5, which in the present embodiment carries the coupling blade, reaches the "Auto" position, whereby the connection between the two setting members 4 and 5 is disengaged and it is possible to reset the exposure time setting ring 4 at the automatic position, unless it already occupies same. The resetting of the exposure time setting member 5 can be effected without additional actuation of the coupling 51, while same becomes automatically operative, as soon as the camera is switched from automatic to manual exposure setting by actuating the setting members 4 and 5.

In order to make allowance for the sensitivity of the film used, the camera provides for the arrangement of a known device for changing the sensitivity of the exposure meter, which operates according to the principle of shading the honeycomb window 12 and the photoelectric cell. The shading device comprises two covering members 57 and 58, which are arranged on both sides of the honeycomb window 12 and are pivotable about the axles 55 and 56, respectively, each of which is engaged by a sliding rod 59 or 60 as well as by a tension spring 61. For the purpose of jointly adjusting the covering members 57 and 58, the two sliding rods 59 and 60 are connected to each other by means of a pin 62, which is guided in a slot 63 on the camera case 1. The above-described shading device is influenced by a control member 64 which is rotatably positioned in the camera case 1 and which comprises a cam 65 acting on the pin 62, as well as a film sensitivity scale 66 adjusted to said cam. Since the control member 64 and the power transmission elements 59 to 62 which are associated therewith of the covering members 57 and 58 are arranged within the camera case 1, a window 67 which is located in the range of the film sensitivity scale 66 and which makes the film sensitivity value set visible, is arranged on the upper side wall of the camera case 1.

The operation of the above-described camera is as follows:

If the camera is to operate with automatic exposure setting, the marks 8 and 9 of the setting members 4 and 5 for exposure time and diaphragm are to coincide with the mark 1b of the front plate 1a, whereupon the operator, when sighting the object to be photographed, will merely have to observe whether a green or red color field or a time/diaphragm pair appears in the view finder picture of the view finder lens 33 and 34. When using an indicating member according to FIGS. 10 and 11, the operator also merely needs to make sure whether the pointer 46 of the exposure meter plays in the range of the scale field 18. If such is the case, the conditions which must exist with respect to film sensitivity and light intensity for obtaining a correctly exposed photograph prevail. The exposure can then be effected after appropriate distance setting of the camera.

But if photographs with manual exposure setting are to be made with the camera, the two interconnected setting members 4 and 5 for exposure time and diaphragm must be rotated until the exposure time and diaphragm scales 4c and 5c comes into the range of the fixed mark 1b. This rotary motion of the setting members 4 and 5 in the embodiment according to FIGS. 1 to 3 produces the effect that the driving pin 30 rides off the ramp 28 of the sliding rod 23, whereby the latter as well as the covering flag 21 turns upwardly due to the action of the spring 27. While simultaneously covering the scale field 18, the window 21a of the covering flag 21 moves in front of the scale field 19 provided with the exposure value scale 19a. This results in the effect that the exposure value registered by the exposure meter in response to the light intensity and the film sensitivity set is now mirrored into the view finder lens 33 and 34 and appears in the view finder picture, as is shown in FIG. 4. The manual exposure setting can then be effected on the basis of the readable value, for which purpose the corresponding exposure value of the exposure value scale 4d, of the exposure setting ring 4 is made to coincide with the mark 5d associated with the exposure value scale. With the exposure value remaining constant, it is possible to select other time/diaphragm pairs, for which purpose the operator may use the coupling 51 provided between exposure time setting member 4 and diaphragm setting member 5.

In a similar manner as in the above-explained arrangement, it is possible, in the embodiment according to FIGS. 10 and 11, simultaneously with the change-over of the camera from automatic to manual exposure setting, by actuating the two setting members 4 and 5 for exposure time and diaphragm, to pivot the covering flag 21 through 180° by means of the gearing shown by reference numerals 42 to 45, and this, in such a manner that in the case of the manual exposure setting the scale 18 is now covered while the scale 19 is simultaneously exposed.

Variations and modifications may be made without departing from the spirit of the invention or the scope of the appended claims.

I claim:

1. A photographic camera with built-in exposure meter and a manually operable setting member, with the aid of which the camera can be selectively switched between automatic and manual exposure setting, comprising an indicating member provided with two scale fields and arranged on the exposure meter for movement in response to varying lighting conditions; a covering flag associated with said indicating member, and said flag being adjustable so that one scale field only is visible during automatic exposure setting of the camera while the other scale field only is made visible during manual exposure setting whereby optimum utilization of said exposure meter is attained in that said exposure meter can be selectively used for indicating the prevailing lighting conditions during either automatic or manual exposure setting of the camera.

2. A camera according to claim 1, wherein the scale field associated with the manual exposure setting is provided with an exposure value scale, and an identical exposure value scale as well as a setting mark therefor is arranged on a setting means for exposure time and diaphragm.

3. A camera according to claim 1 wherein a releasable coupling is provided between two setting means for exposure time and diaphragm, said coupling means is rendered operative upon changing the camera from automatic to manual exposure setting.

4. The invention as defined in claim 1 and including optical means for reflecting the readings of either of said scales in the view finder of the camera.

5. The invention as defined in claim 1, wherein said camera has a casing having a window therein for viewing said scales directly.

6. A camera according to claim 2, wherein a releasable coupling is provided between two setting means for exposure time and diaphragm.

7. A photographic camera with built-in exposure meter and a manually operable setting member, with the aid of which the camera can be selectively switched between automatic and manual exposure setting, comprising an indicating member provided with two scale fields and arranged on the exposure meter; a covering flag associated with said indicating member, and said flag being adjustable so that one scale field only is visible during automatic exposure setting of the camera while the other scale field only is made visible during manual exposure setting whereby optimum utilization of said exposure meter is attained in that said exposure meter can be selectively used for indicating the prevailing lighting conditions during either automatic or manual exposure setting of the camera, said setting means for exposure time and diaphragm serving as switching means for selectively setting the camera at the desired kind of exposure.

8. A photographic camera with built-in exposure meter and a manually operable setting member, with the aid of which the camera can be selectively switched between automatic and manual exposure setting, comprising an indicating member provided with two scale fields and arranged on the exposure meter; a covering flag associated with said indicating member, and said flag being adjustable so that one scale field only is visible during automatic exposure setting of the camera while the other scale field only is made visible during manual exposure setting whereby optimum utilization of said exposure meter is attained in that said exposure meter can be selectively used for indicating the prevailing lighting conditions during either automatic or manual exposure setting of the camera, the scale field associated with the manual exposure setting being provided with an exposure value scale, and an identical exposure value scale as well as a setting mark therefor being arranged on a setting means for exposure time and diaphragm, serving as switching means for selectively setting the camera at the desired kind of exposure setting.

9. A photographic camera with built-in exposure meter and a manually operable setting member, with the aid of which the camera can be selectively switched between automatic and manual exposure setting, comprising an indicating member provided with two scale fields and arranged on the exposure meter; a covering flag associated with said indicating member, and said flag being adjustable so that one scale field only is visible during automatic exposure setting of the camera while the other scale field only is made visible during manual exposure setting whereby optimum utilization of said exposure meter is attained in that said exposure meter can be selectively used for indicating the prevailing lighting conditions during either automatic or manual exposure setting of the camera, a releasable coupling provided between two setting means for exposure time and diaphragm, said coupling means being rendered operative upon changing the camera from automatic to manual exposure setting, and said setting means for exposure time and diaphragm serving as switching means for selectively setting the camera at the desired kind of exposure setting.

References Cited in the file of this patent

UNITED STATES PATENTS

| | | |
|---|---|---|
| 2,999,439 | Nerwin | Sept. 12, 1961 |
| 3,017,814 | Greger | Jan. 23, 1962 |